United States Patent [19]

Lundy

[11] 3,998,612
[45] Dec. 21, 1976

[54] ANNULAR VENTURI GAS SCRUBBER

[75] Inventor: Alvin S. Lundy, West Bloomfield, Mich.

[73] Assignee: Schneible Company, Holly, Mich.

[22] Filed: Sept. 5, 1975

[21] Appl. No.: 610,696

[52] U.S. Cl. .................................. 55/220; 55/230; 261/62; 261/DIG. 54; 261/DIG. 56
[51] Int. Cl.² ........................................ B01D 47/10
[58] Field of Search ............ 55/226, 230, 224, 220; 261/62, DIG. 54, DIG. 56

[56] References Cited

UNITED STATES PATENTS

| 908,963 | 1/1909 | Cramer | 261/DIG. 54 |
|---|---|---|---|
| 2,616,563 | 11/1952 | Hebb | 261/DIG. 54 |
| 2,643,105 | 6/1953 | Lipowitz | 261/DIG. 54 |
| 3,048,956 | 8/1962 | Lundy et al. | 261/DIG. 54 |
| 3,343,341 | 9/1967 | Wiemer | 55/226 X |
| 3,350,076 | 10/1967 | Crommelin, Jr. | 261/DIG. 54 |
| 3,406,499 | 10/1968 | Wiemer | 261/DIG. 54 |
| 3,789,585 | 2/1974 | Arnold et al. | 261/DIG. 54 |
| 3,834,127 | 9/1974 | Jordan et al. | 55/226 |

Primary Examiner—Frank W. Lutter
Assistant Examiner—David L. Lacey
Attorney, Agent, or Firm—Tilton, Fallon, Lungmus, Chestnut & Hill

[57] ABSTRACT

A gas-scrubbing apparatus for treating contaminated gas with a liquid to remove particulates and other impurities. Liquid is discharged radially outwardly from a central nozzle or jet and is directed between a pair of upper and lower walls which converge radially outwardly, and then diverge radially outwardly, to define an annular venturi. Gas flowing upwardly through a central opening in the lower wall passes outwardly through the venturi where it intimately mixes with the liquid discharged from the nozzle. In one embodiment, the upper wall has a trough-shaped upper surface communicating directly with the throat of the venturi for introducing recirculated liquid into the liquid-gas mixture flowing outwardly through the venturi.

17 Claims, 4 Drawing Figures

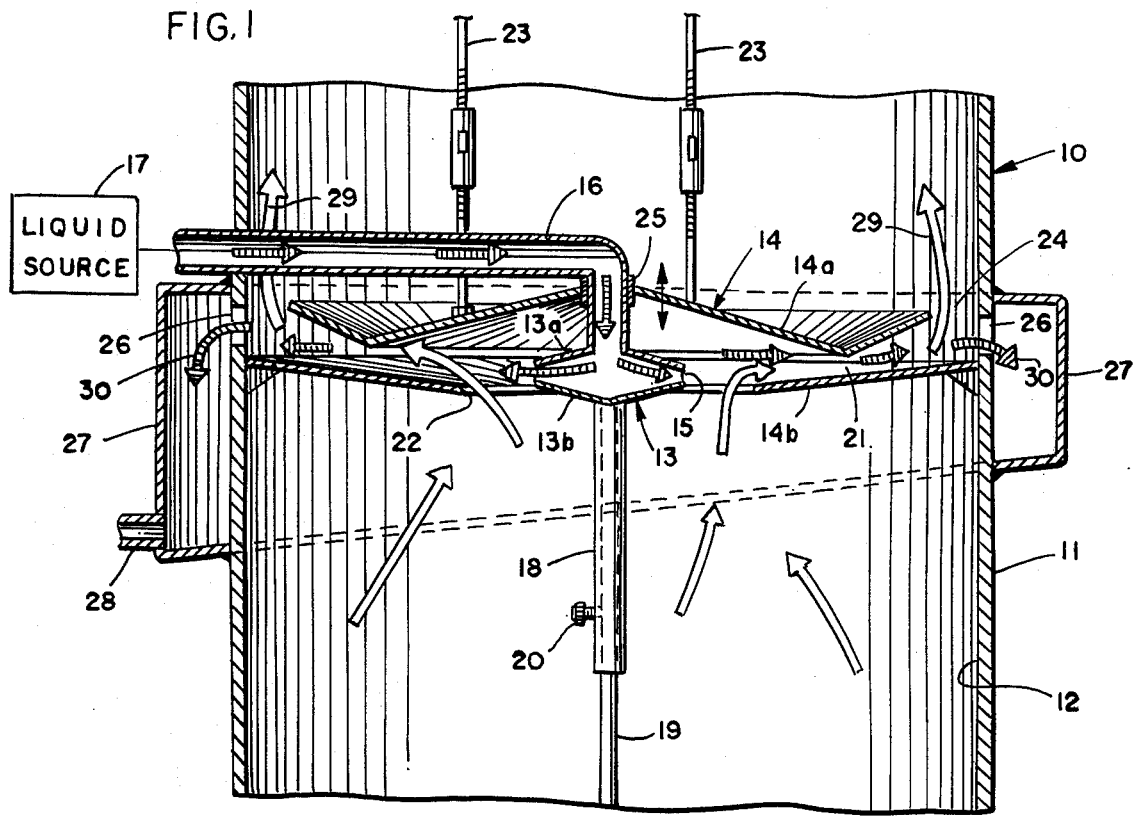
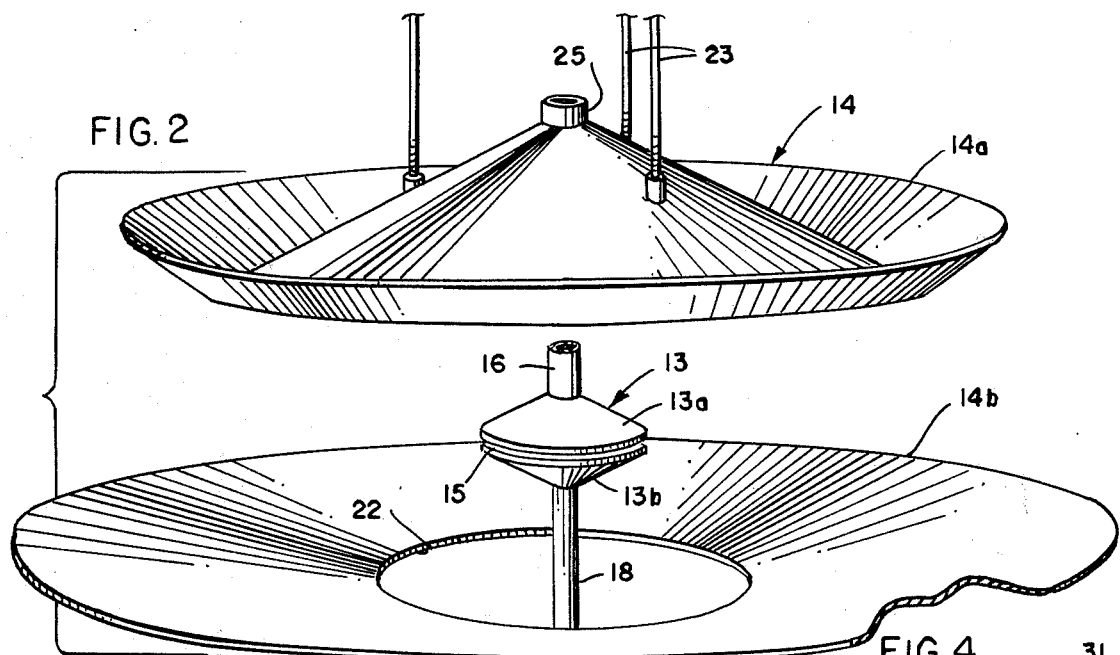
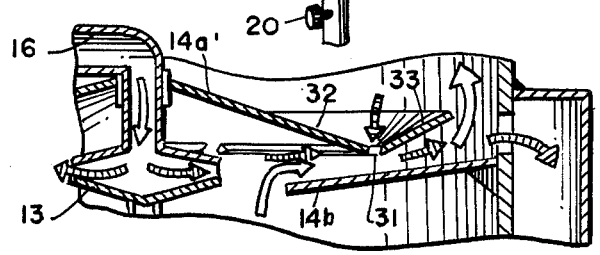
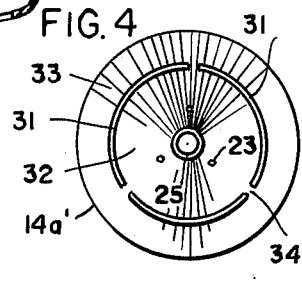

ANNULAR VENTURI GAS SCRUBBER

BACKGROUND AND SUMMARY

As is well known, the introduction of a scrubbing liquid into a turbulent gas stream to provide intimate mixing of the liquid and gas breaks the liquid up into extremely fine particles which collide and adhere to dust particles and other impurities. Agglomeration of the dust-laden liquid particles or droplets then permits separation of the liquid and the cleansed gas by means of any conventional mist separator. To increase scrubbing efficiency, and specifically to insure intimate mixing of the liquid and gas, venturi systems have been used as shown, for example, in U.S. Pat. Nos. 3,048,956 and 3,350,076.

This invention is concerned with a venturi gas scrubber in which the venturi is formed in an annular shape through which gas and liquid flow in radial directions. The scrubbing liquid is discharged under pressure from a centrally-disposed nozzle which directs the liquid radially and in generally the same plane as the venturi itself. The nozzle may be adjustable to control the discharge of liquid and the walls which define the venturi may also be moved relative to each other to vary the dimensions of the venturi. In one embodiment, the upper wall of the venturi is provided with a trough-shaped top surface, the trough being annular in shape and communicating along substantially its full length with the throat of the venturi passage. Liquid separated from the gas above the upper wall is therefore collected in the trough and recycled through the venturi, resulting in relatively high scrubbing and collection efficiency for the amount of supply liquid, normally water, required by the system.

The annular venturi scrubber of this invention therefore eliminates the use of small nozzles, conserves space, provides a favorable aspect ratio for contact between a gas and a liquid, and, in the embodiment which provides for recycling of liquid, permits a reduction in liquid supply requirements.

Other advantages and objects of the invention will become apparent from the specification and drawings.

DRAWINGS

FIG. 1 is a fragmentary vertical sectional view of an apparatus embodying the present invention.

FIG. 2 is an exploded perspective view of the nozzle and venturi-forming elements.

FIG. 3 is a fragmentary sectional view showing a modified form of the invention.

FIG. 4 is a plan view in reduced scale showing the top wall which forms part of the venturi of the embodiment illustrated in FIG. 3.

DESCRIPTION

Referring to the drawings, the numeral 10 generally designates a gas-scrubbing apparatus having a vertical cylindrical casing 11 defining a chamber 12. The casing is not shown in its entirety because the omitted portions, and the elements provided therein, are conventional, well known, and do not constitute a part of this invention. It is to be understood that the lower part of the casing would include an inlet for contaminated gas which is dimensioned and positioned to force the gas upwardly in a spiral path. The vortex action directs heavier particulate materials outwardly and, at the same time, cleansing liquid (water) may be introduced in the lower portion of the chamber to humidify the gas and assist in the preliminary removal of larger particulates. Reference may be had to U.S. Pat. No. 2,604,185, and to other prior patents, for typical structures for the pre-cleaning of the contaminated gases.

Within the intermediate portion of the chamber 12 is a nozzle assembly 13 and a venturi assembly 14. The nozzle is disposed along the vertical mid line of the chamber and consists essentially of upper and lower frusto-conical plates 13a and 13b which are spaced apart at their outer edges to define an annular discharge orifice 15. The orifice lies in a horizontal plane for directing liquid outwardly over an angular sweep of 360°. As shown most clearly in FIG. 1, the upper plane 13a is centrally apertured and communicates with a conduit 16 which extends from a suitable source 17 of water or other liquid under pressure. The lower plate 13b is connected to a sleeve 18 which telescopingly receives rigid standard 19. The sleeve may be shifted along the standard, and anchored in any selected position therealong by screw 20, to adjust the vertical dimension of annular orifice 15.

The venturi assembly 14 consists essentially of an upper wall or plate 14a and a lower wall or plate 14b, the two plates being spaced apart to define an annular venturi slot 21 extending about orifice 15 at substantially the same level, or just slightly above, that orifice. The lower plate or wall 14b is provided with an enlarged central aperture 22 for the entry of upwardly flowing gas into the venturi passage. The periphery of the lower wall is of substantially the same diameter as chamber 12 and is secured to cylindrical wall 11. In the illustration given, the lower wall 14b is slightly dish-shaped — that is, it slopes upwardly and outwardly — to contribute in directing gas upwardly after it leaves the venturi and to promote more effective and efficient separation of gas and liquid.

The upper plate or wall 14a is vertically adjustable, being suspended from the upper end of the casing (not shown) by three or more sets of threaded rods and connectors 23. It is to be understood, of course, that any other suitable means for adjustably supporting or suspending the upper wall may be provided. It will be noted that the upper wall has a diameter substantially less than that of the chamber 12, thereby providing an annular outlet 24 for the upward flow of gas discharged from the venturi. The upper wall is also provided with a central sleeve 25 which slidably receives the vertical portion of liquid conduit 16.

Walls 14a and 14b diverge in an outward direction from the annular venturi slot 21, and also diverge in a radially inward direction from that slot, all as clearly shown in FIG. 1. Thus, the venturi passage or throat, when viewed in radial vertical section, tapers outwardly from the center of the apparatus towards annular slot 21 and then, starting at the annular slot, progressively increases in its vertical dimensions. By adjusting hangers 23, the vertical dimensions of the venturi throat or slot may be varied as desired to achieve maximum operating efficiency.

Immediately above lower wall 14b, the vertical wall 11 of the casing is provided with one or more drain openings 26 which communicate with an annular trough 27 encircling the scrubber casing. An outlet conduit 28 connects to the trough and may communicate with a pre-cleaner (not shown) in the lower portion of the casing for the purpose of humidifying and pre-cleaning the contaminated gas entering the system.

In use, contaminated gases, such as flue gases, fumes from industrial operations, and air contaminated with any of a wide variety of particulates and other contaminants, enters the lower portion of the casing and travels upwardly in a spiral path towards venturi assembly 14. As already indicated, such gases may be subjected to a pre-cleaning operation before entering opening 22 in the bottom wall 14b. Upon entry into the venturi chamber, the partially-cleansed gases are intimately mixed with a scrubbing liquid, ordinarily water, discharged under pressure from the annular orifice 15 of nozzle assembly 13. Such mixing is promoted by the outward flow of the gas and entrained liquid particles with increasing velocity towards the annular slot or throat of the venturi. Following such turbulent intermixing, the scrubbed gases, represented by arrows 29 in FIG. 1, flow through outlet 24 into the upper portion of the chamber 12 and the contaminated liquid flow into trough 27 as represented by arrows 30.

The embodiment of FIGS. 3 and 4 is identical to the version already described except that the top wall 14a' is provided with slits 31 which communicate directly with the throat of the venturi. It will be observed that the upper surface of wall 14a' (and also wall 14a) has a downwardly and outwardly sloping inner annular portion 32 and an outwardly and upwardly sloping outer annular portion 33, the inner and outer portions defining an annular trough which is open at its lower limits by reason of arcuate slits 31. The trough serves as a collector and recycling means for liquid released from the saturated or near-saturated gases discharged from the venturi and flowing into the upper portion of the casing. It is to be understood that any conventional demisting means may be mounted in the upper portion of the casing to promote gas-liquid separation, and that the extreme upper end of the casing would be provided with a suitable outlet for the discharge or recirculation of scrubbed gases.

Slits 31 are arcuate in shape only because of the need for some bridging connections 34 between the outer and inner portions of the upper wall. It is to be understood that if such bridging connections are eliminated, as where independent supporting are provided for the outer portion of the upper wall, or where arching connectors join the inner and outer wall portions, then slits 31 may be merged together as a continuous slit extending 360° about the bottom of the trough. Where connections 34 are used as shown, their circumferential dimensions should be kept to a minimum so that the trough will communicate along substantially its entire circumferential extent (i.e., at least 350°) with the venturi throat directly therebelow.

While in the foregoing I have disclosed embodiments of the invention in considerable detail for purposes of illustration, it will be understood by those skilled in the art that many of these details may be varied without departing from the spirit and scope of the invention.

I claim:

1. A venturi gas scrubber comprising a casing having a vertical wall defining a gas treatment chamber, a nozzle disposed along the vertical mid line of said chamber having an annular discharge orifice oriented for directing liquid under pressure radially outwardly about substantially 360° in a generally horizontal plane, and an annular venturi extending about said orifice, said venturi being defined by upper and lower walls spaced apart to form a narrow annular slot extending along said plane, said walls diverging from each other in a radially inward direction from said slot and also diverging in a radially outward direction from said slot, said lower wall being provided with an enlarged central aperture for the entry of upwardly flowing gas into the space between said walls, said casing having inlet means below said lower wall for the flow of contaminated gas into said casing and towards said central aperture and having outlet means for the outflow of gas discharged from said venturi, drain means for contaminated liquid, and means for delivering liquid under pressure to said nozzle.

2. The scrubber of claim 1 in which said lower wall has its periphery in sealing engagement with the wall of said casing.

3. The scrubber of claim 1 in which said nozzle includes upper and lower plates spaced closely about their edges to define said annular discharge orifice, at least one of said plates being vertically movable for selectively adjusting the vertical dimension of said orifice.

4. The scrubber of claim 1 in which said upper wall has its periphery spaced from the vertical wall of said casing to comprise said outlet means for the upward flow of gas discharged from said venturi.

5. The scrubber of claim 4 in which said upper wall has an upper surface provided with a downwardly and radially outwardly sloping inner annular portion and an upwardly and radially outwardly sloping outer annular portion, said inner and outer portions defining an annular trough having discharge means for the discharge of liquid collected by said trough into said venturi.

6. The scrubber of claim 5 in which said discharge means of said trough comprises a plurality of arcuate slits.

7. The scrubber of claim 6 in which the angular extent of said slits of said trough is at least 350°.

8. The scrubber of claim 5 in which means are provided for movably supporting one of said walls for altering the vertical dimensions of said venturi.

9. A venturi gas scrubber comprising a casing having a generally cylindrical wall defining a gas treatment chamber and having inlet and outlet means for the upward flow of gas through said chamber, drain means for contaminated liquid, wherein the improvement comprises a nozzle disposed along the longitudinal mid line of said chamber having an annular discharge orifice for directing liquid under pressure radially outwardly about substantially 360°, and an annular venturi extending about said orifice, said venturi being defined by upper and lower plates spaced apart to form a narrow annular venturi slot extending about and spaced radially from said orifice, said upper plate having an inner portion sloping radially inwardly and upwardly from said slot and an outer portion sloping radially outwardly and upwardly from said slot, said inner and outer portions defining an annular trough, and at least one slit extending along said trough for placing said trough in flow communication with said venturi, said lower plate having a central aperture for the entry of gas into said venturi.

10. The scrubber of claim 9 in which only a single slit is provided, said slit extending at least 350° along said trough.

11. The scrubber of claim 10 in which said slit communicates with said venturi along said annular venturi slot.

12. The scrubber of claim 9 in which a plurality of said slits are provided, said inner and outer portions of said upper plate being joined to each other by connecting portions disposed between the ends of said slits.

13. The scrubber of claim 12 in which the angular length of said plurality of slits is at least 350°.

14. The scrubber of claim 9 in which means are provided for movably supporting at least one of said plates for altering the dimensions of said venturi.

15. The scrubber of claim 9 in which said lower plate slopes radially outwardly and upwardly from said central opening towards the periphery thereof.

16. The scrubber of claim 15 in which the periphery of said lower plate is secured to said cylindrical wall of said casing.

17. The scrubber of claim 9 in which said nozzle includes upper and lower plates spaced closely about their edges to define said annular discharge orifice, at least one of said nozzle plates being axially movable for selectively adjusting the size of said orifice.

* * * * *